US010605342B2

(12) United States Patent
Brieschke

(10) Patent No.: US 10,605,342 B2
(45) Date of Patent: Mar. 31, 2020

(54) LINEAR ACTUATOR WITH TORQUE LIMITER MOUNTED TO A DRIVEN SPROCKET

(71) Applicant: Aries Engineering Company, Inc., Dundee, MI (US)

(72) Inventor: Mark A. Brieschke, Ida, MI (US)

(73) Assignee: Aries Engineering Company, Inc., Dundee, MI (US)

( * ) Notice: Subject to any disclaimer, the term of this patent is extended or adjusted under 35 U.S.C. 154(b) by 191 days.

(21) Appl. No.: 15/887,315

(22) Filed: Feb. 2, 2018

(65) Prior Publication Data

US 2019/0242466 A1 Aug. 8, 2019

(51) Int. Cl.
*F16H 25/20* (2006.01)
*F16H 55/17* (2006.01)

(52) U.S. Cl.
CPC ....... *F16H 25/2021* (2013.01); *F16H 55/171* (2013.01); *F16H 2025/204* (2013.01); *F16H 2025/2071* (2013.01); *F16H 2025/2081* (2013.01); *F16H 2025/2096* (2013.01); *F16H 2055/178* (2013.01)

(58) Field of Classification Search
CPC ............. F16H 2025/2081; F16H 25/20; F16H 25/2204; Y10T 74/18696; H02K 7/06
USPC .......................................................... 474/152
See application file for complete search history.

(56) References Cited

U.S. PATENT DOCUMENTS 3,412,623 A * 11/1968 Gritt ........................ F16D 13/52 474/73
3,523,599 A * 8/1970 Denkowski ............... B66F 3/18 192/150
4,144,981 A * 3/1979 Borgen .................. B22D 41/12 222/610
4,385,675 A * 5/1983 Blee ....................... G05D 13/62 180/178
4,526,257 A * 7/1985 Mueller .................. F16D 35/00 192/48.2
4,662,861 A * 5/1987 Seung ..................... F02B 67/06 192/48.92

(Continued)

FOREIGN PATENT DOCUMENTS

GB 2431215 A 4/2007
JP 2004332759 A 11/2004

(Continued)

*Primary Examiner* — Henry Y Liu
(74) *Attorney, Agent, or Firm* — MacMillan, Sobanski & Todd, LLC

(57) ABSTRACT

A driven sprocket configured for rotational use in a linear actuator is provided. The driven sprocket includes an outer circumferential surface extending radially from a main body. The outer circumferential surface has a plurality of spaced apart gear teeth configured to engage corresponding structures of a drive belt. An upper rim and a lower rim bound the outer circumferential surface and are configured to maintain a drive belt in an engaged position with the gear teeth. A plurality of internal apertures extend therethrough and are configured to receive portions of a lead screw and portions of a torque limiter. A plurality of spaced apart apertures are configured to receive fasteners configured to secure the torque limiter to the driven sprocket in a manner such that rotation of the driven sprocket results in rotation of the torque limiter.

15 Claims, 7 Drawing Sheets

(56) References Cited

U.S. PATENT DOCUMENTS 4,712,440 A * 12/1987 Rousselot ........... F16H 25/2015 74/89.37
4,794,314 A * 12/1988 Janu ...................... F16K 31/046 318/685
4,946,016 A * 8/1990 Torres ..................... B65B 57/00 192/48.2
5,053,685 A * 10/1991 Bacchi .................... F16H 25/20 310/80
5,111,708 A * 5/1992 Brusasco ................ F16F 1/373 310/83
5,332,060 A * 7/1994 Sperduti .............. B60K 17/344 180/197
5,634,373 A * 6/1997 Cuffe ...................... F16H 25/20 74/640
5,655,636 A * 8/1997 Lang ....................... B64C 13/28 192/223
5,682,026 A * 10/1997 Auclair .................. G01N 35/04 235/375
5,957,798 A * 9/1999 Smith, III ............... B64C 13/34 475/5
6,240,797 B1 * 6/2001 Morishima ......... F16H 25/2454 188/134
6,589,121 B1 * 7/2003 Leonard .................. F16D 21/08 192/46
6,879,065 B2 * 4/2005 Corbett, Jr. ............ H02K 29/03 192/141
7,118,502 B2 * 10/2006 Puzey .................... B62K 3/002 474/60
7,331,406 B2 * 2/2008 Wottreng, Jr. ........ B25B 23/045 173/176
7,880,345 B2 * 2/2011 Hoffmann ................ H02K 7/06 310/12.13
8,006,579 B2 * 8/2011 Kuribayashi ........... F16H 25/20 192/69.62
2002/0134180 A1 * 9/2002 Gorin .................. F16H 25/2015 74/89.37
2002/0166221 A1 * 11/2002 Clew ...................... B21J 15/025 29/407.02
2004/0237864 A1 * 12/2004 Frazer .................... D05B 11/00 112/117
2006/0012584 A1 * 1/2006 Vassallo .................. G06F 3/016 345/184
2006/0163026 A1 * 7/2006 Lang ....................... F16D 67/00 192/223
2008/0048514 A1 * 2/2008 Hoffmann ................ H02K 7/06 310/78
2009/0288511 A1 * 11/2009 Kuribayashi ........... F16H 25/20 74/89.38
2011/0298323 A1 * 12/2011 Brieschke ............... F16H 25/20 310/83
2015/0210359 A1 * 7/2015 McClure .................. B63G 8/00 114/333
2017/0232840 A1 * 8/2017 Pritchard ............. B60K 17/344 74/665 GE

FOREIGN PATENT DOCUMENTS

JP 2007187279 A 7/2007
KR 101383262 B1 4/2014

* cited by examiner

LINEAR ACTUATOR WITH TORQUE LIMITER MOUNTED TO A DRIVEN SPROCKET

BACKGROUND

Electro-mechanical actuators are used in a wide variety of industrial applications such as, for example, machine presses and the like. A typical electro-mechanical actuator includes an electric motor that functions as a source of rotational power to provide torque to a linear actuator mounted adjacent thereto. The linear actuator is configured to convert the torque into a linear force.

Linear actuators typically include a lead screw that is supported for rotation within a housing. The lead screw is connected for rotation with an output shaft of the electric motor, such as by a belt and pulley system. A driven nut is supported on the lead screw and has an inner diameter that corresponds with an outer diameter of the lead screw. As the lead screw is rotated relative to the driven nut, the driven nut travels linearly along a length of the lead screw, thereby converting rotational power into a linear force. A ram is secured to the driven nut for movement therewith. An end portion of the ram extends from the housing and is adapted to transfer the linear force to a desired work piece.

In certain applications involving high press loads, increased ram speeds, or high precision, the linear actuator can experience internal torque forces that are higher than desired internal torque forces. If unattended, the high internal torque forces can result in damage to the linear actuator.

It would be advantageous if linear actuators could be protected from high internal torque forces.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the linear actuator having a torque limiter.

The above objects as well as other objects not specifically enumerated are achieved by a driven sprocket configured for rotational use in a linear actuator. The driven sprocket includes an outer circumferential surface extending radially from a main body. The outer circumferential surface has a plurality of spaced apart gear teeth configured to engage corresponding structures of a drive belt. An upper rim and a lower rim bound the outer circumferential surface and are configured to maintain a drive belt in an engaged position with the gear teeth. A plurality of internal apertures extend therethrough and is configured to receive portions of a lead screw and portions of a torque limiter. A plurality of spaced apart apertures are configured to receive fasteners configured to secure the torque limiter to the driven sprocket in a manner such that rotation of the driven sprocket results in rotation of the torque limiter.

The above objects as well as other objects not specifically enumerated are also achieved by a linear actuator. The linear actuator includes a motor and a driven sprocket coupled to the motor. The driven sprocket is configured for rotation. The linear actuator further includes a housing and an input member coupled to the driven sprocket and supported for rotation within the housing. An output member is configured to travel linearly along the input member when the input member is rotated relative to the output member. A guide rail extends along an inner surface of the housing and the output member engages the guide rail to prevent rotation of the output member. A torque limiter is coupled to the driven sprocket such that rotation of the driven sprocket results in rotation of the torque limiter.

The above objects as well as other objects not specifically enumerated are also achieved by a method of assembling a linear actuator including the steps of rotating an output shaft of a motor, connecting the output shaft of a motor with a driven sprocket in a manner such that rotation of the output shaft results in rotation of the driven sprocket, coupling an input member with the driven sprocket in a manner such that rotation of the driven sprocket results in rotation of the input member, arranging an output member to travel linearly along the input member in a manner such that the input member is rotated relative to the output member, providing a guide rail along an inner surface of the housing in a manner such that the output member engages the guide rail to prevent rotation of the output member and securing a torque limiter to the driven sprocket such that rotation of the driven sprocket results in rotation of the torque limiter.

Various objects and advantages of the linear actuator having a torque limiter will become apparent to those skilled in the art from the following detailed description, when read in light of the accompanying drawings.

DETAILED DESCRIPTION

The linear actuator having a torque limiter mounted to a driven sprocket will now be described with occasional reference to specific embodiments. The linear actuator having a torque limiter mounted to a driven sprocket may, however, be embodied in different forms and should not be construed as limited to the embodiments set forth herein. Rather, these embodiments are provided so that this disclosure will be thorough and complete, and will fully convey the scope of the linear actuator having a torque limiter mounted to a driven sprocket to those skilled in the art.

Unless otherwise defined, all technical and scientific terms used herein have the same meaning as commonly understood by one of ordinary skill in the art to which the linear actuator having a torque limiter mounted to a driven sprocket belongs. The terminology used in the description of the linear actuator having a torque limiter mounted to a driven sprocket is for describing particular embodiments only and is not intended to be limiting of the linear actuator having a torque limiter mounted to a driven sprocket. As used in the description of the linear actuator having a torque limiter mounted to a driven sprocket and the appended claims, the singular forms “a,” “an,” and “the” are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term “about.” Accordingly, unless otherwise indicated, the numerical properties set forth in the specification and claims are approximations that may vary depending on the desired properties sought to be obtained in embodiments of the linear actuator having a torque limiter mounted to a driven sprocket. Notwithstanding that the numerical ranges and parameters setting forth the broad scope of the linear actuator having a torque limiter mounted to a driven sprocket are approximations, the numerical values set forth in the specific examples are reported as precisely as possible. Any numerical values, however, inherently contain certain errors necessarily resulting from error found in their respective measurements.

The description and figures disclose a linear actuator having a torque limiter mounted to a driven sprocket. Generally, mounting the torque limiter to the driven sprocket in the manner described herein facilitates the use of torque limiters having differing mounting configurations.

Figure 1:
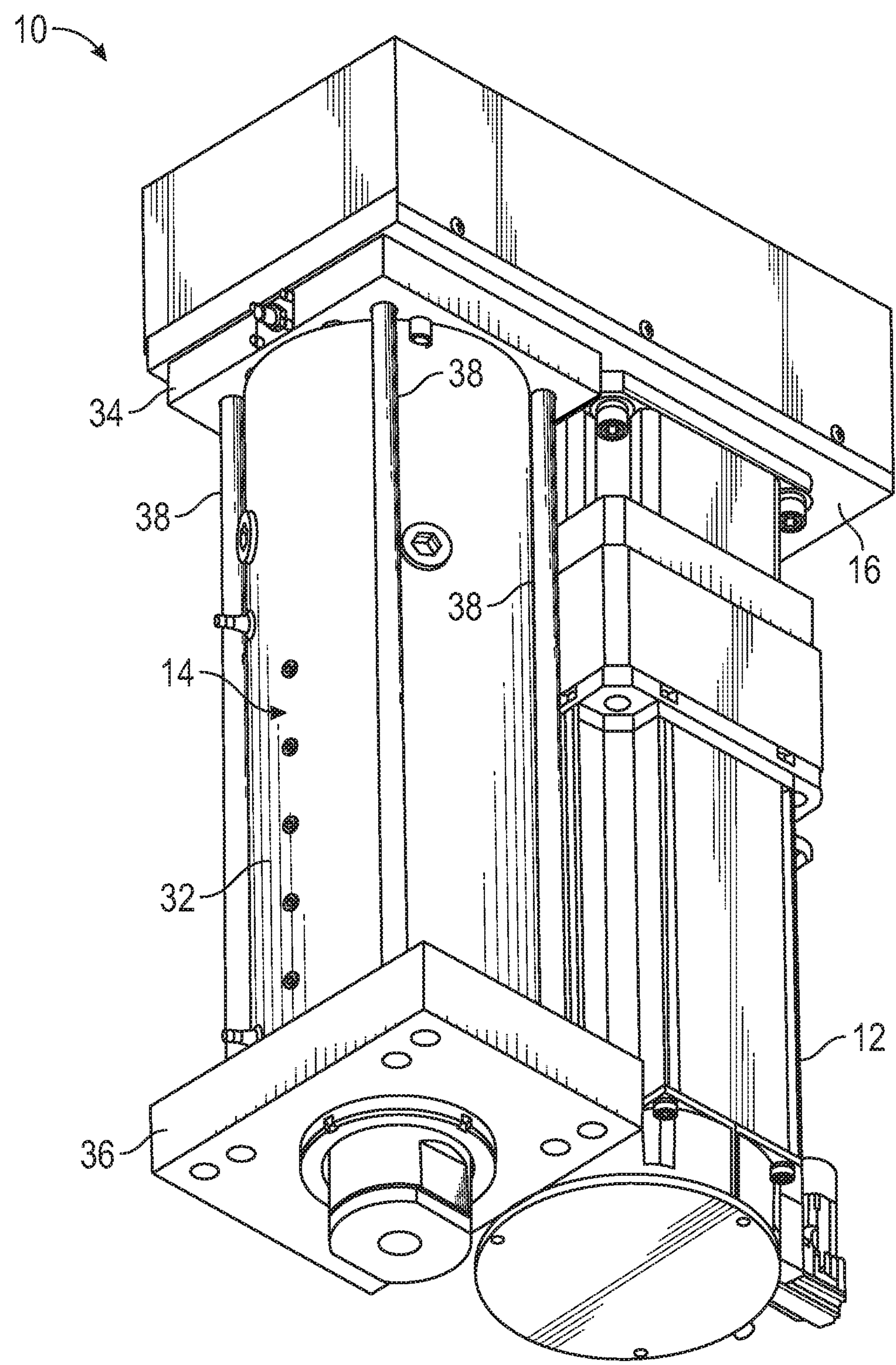
FIG. 1 is a perspective view of an electro-mechanical actuator that includes a linear actuator, a motor, a torque limiter and a driven sprocket configured to support the torque limiter in accordance with this invention.
Figure 2:
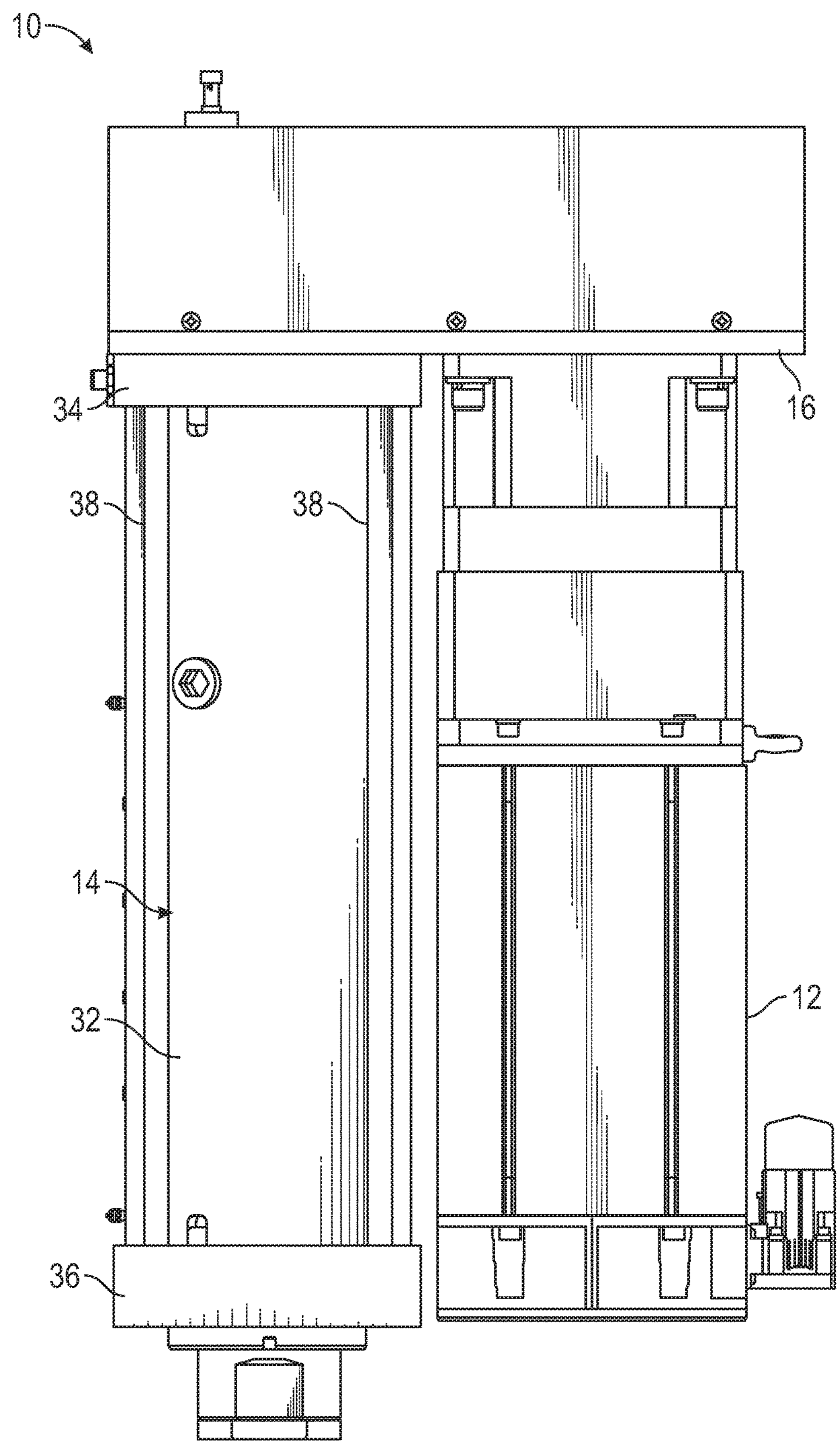
FIG. 2 is a side view of the electro-mechanical actuator of FIG. 1.
Figure 3:
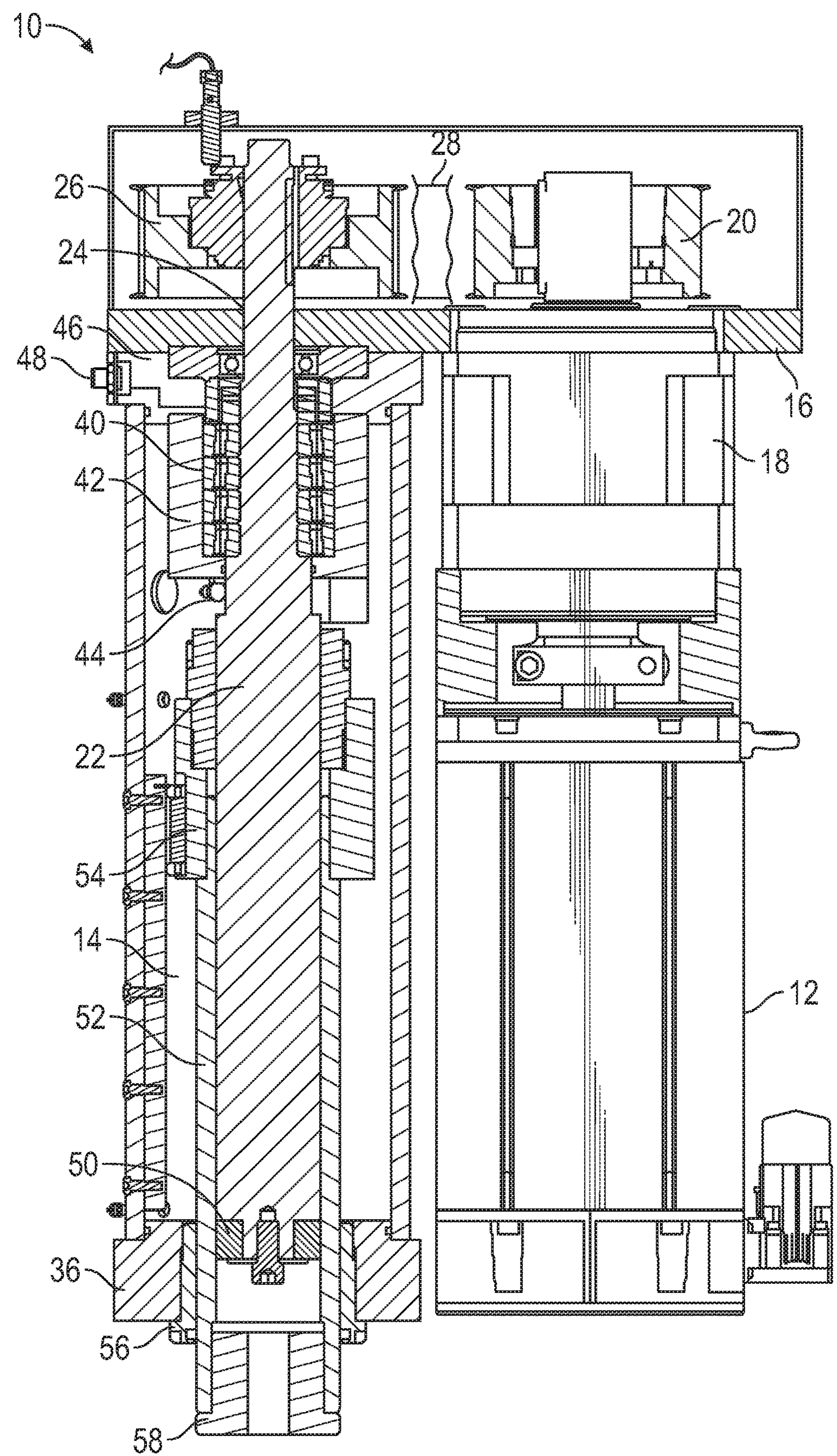
FIG. 3 is a cross-sectional front view of the electro-mechanical actuator shown of FIG. 1.

Referring now to the drawings, there is illustrated in FIGS. 1-3 an electro-mechanical linear actuator assembly (hereafter “actuator assembly”), indicated generally at 10. The actuator assembly 10 is equipped with a torque limiter mounted to a driven sprocket in accordance with this invention. The actuator assembly 10 may be used in a wide variety of applications such as, for example, machine presses and the like. The actuator assembly 10 includes a motor 12 and a linear actuator 14 that are supported adjacent to one another on a mounting plate 16. The motor 12 is configured to function as a source of rotational power to provide torque to the linear actuator 14. The linear actuator 14 converts the torque into a linear force, as will be explained below. Although the actuator assembly 10 will be described and illustrated in the context of a machine press, it should be appreciated that the actuator assembly 10 may be used in any desired environment and for any desired purpose.

Referring again to FIGS. 1-3, the motor 12 can be any apparatus that is configured to provide rotational power to the linear actuator 14, such as an alternating current or direct current electric motor. The motor 12 may also be embodied as a servomotor that is adapted to be automatically controlled by a closed loop control system (not shown). For example, the motor 12 can be controlled in response to any operating parameter of the actuator assembly 10, such as speed, travel, or press force produced by the linear actuator 14. Alternatively, the motor 12 can be otherwise operated in any suitable manner including but not limited to manual operation.

Referring again to FIGS. 1-3, the illustrated motor 12 and linear actuator 14 are separately secured to the mounting plate 16 and extend downwardly therefrom. It should be appreciated, however, that the motor 12 and the linear actuator 14 can be otherwise configured in any manner relative to the mounting plate 16 or to one another for a desired application. For example, the motor 12 and the linear actuator 14 may be individually mounted to separate support members, may extend in opposite directions, or may be mounted together within a housing if so desired.

Referring again to FIGS. 1-3, the illustrated mounting plate 16 is a generally flat member that includes a plurality of thru-holes for securing the motor 12 and the linear actuator 14 thereto. For example, the motor 12 and the linear actuator 14 can be secured to the mounting plate 16 by a plurality of threaded fasteners, although such is not necessarily required. The mounting plate 16 may optionally include stepped portions, recessed portions, or any other structural features to facilitate securing the motor 12 and the linear actuator 14 thereto. The mounting plate 16 will be further described below.

Referring now to FIG. 3, the motor 12 includes an output shaft (not shown) that extends upwardly and is coupled to a gear reducer 18. The gear reducer 18 is configured to multiply the amount of torque generated by the rotational output of the output shaft of the motor 12 and further configured to reduce rotational speed of the output shaft of the motor 12 to achieve desired output speeds. In the illustrated embodiment, the gear reducer 18 has a gearhead ratio of 5:1 and a gearhead size of 18. However, in other embodiments, the gear reducer 18 can have other gearhead ratios and other gearhead sizes sufficient to provide the desired torque and the desired reduction in the rotational speed of the output shaft of the motor 12.

Referring again to FIG. 3, the gear reducer 18 includes a gear reducer output shaft (not shown) that extends upwardly through a first aperture (not shown) formed in the mounting plate 16. A drive sprocket 20 can be secured to an end portion of the gear reducer output shaft. As will be described below, a ball screw 22 is supported for rotation within the linear actuator 14 and a portion thereof extends upwardly through a second aperture 24 formed in the mounting plate 16. A driven sprocket 26 can be secured to an end portion of the lead screw 22. A drive belt 28 connects the driven pulley 26 for rotation with the drive pulley 20. For example, the illustrated drive belt 28 is a cog-style belt that is, in large part, conventional in the art and includes teeth or notches that are adapted to engage outer diameters of the drive and driven pulleys 20, 26 in mating fashion. Alternatively, the actuator assembly 10 may include a V-belt, grooved belt, or a chain and sprocket configuration. It should also be appreciated that the actuator assembly 10 may incorporate any other system that is configured to transfer rotational power from the motor 12 to the linear actuator 14, such as a plurality of meshed gears or the like.

Referring again to FIGS. 1 and 2, a protective cover 30 may be attached to the mounting plate 16 so as to enclose the drive and driven pulleys 20, 26 and the drive belt 28, although such is not required. The protective cover 30 is, in large measure, conventional in the art and can be any structure that is configured to prevent contact with the drive and driven pulleys 20, 26 or contamination of the drive belt 28. The illustrated protective cover 30 is secured to the mounting plate 16 by a plurality of fasteners, but can otherwise be secured thereto in any suitable manner.

Referring now to FIGS. 1 and 2, the linear actuator 14 includes a housing 32. The illustrated housing 32 is a hollow, cylindrical structure having openings at opposite ends thereof. For example, the housing 32 can be a high strength, heavy walled steel tube member if so desired. It should be appreciated, however, that the housing 32 can be any structural member that is configured to accomplish the functions described below.

Referring again to FIGS. 1 and 2, the illustrated housing 32 includes a cylinder base 34 secured to a first end thereof and a cylinder head 36 secured to a second end thereof. The cylinder base 34 and the cylinder head 36 can be generally flat members that are configured to enclose the open ends of the housing 32. The cylinder base 34 and the cylinder head 36 may optionally include a stepped portion that is configured to be press-fit or otherwise inserted into the open ends of the housing 32 to provide radial support for the housing 32. A seal (not shown) or the like can be disposed between each of the stepped portions and an inner surface of the housing 32 to provide a sealed connection therebetween. The cylinder base 34 and the cylinder head 36 may include any structural features or have any shape for a desired application.

Referring again to FIGS. 1 and 2, the illustrated cylinder base 34 and cylinder head 36 are secured to the housing 32 by a plurality of tie rods 38 that extend therebetween. Thus, the cylinder base 34 and the cylinder head 36 may each define an outer flange portion that is configured to receive and secure end portions of the tie rods 38 thereto. For example, the cylinder base 34 and the cylinder head 36 may include threaded apertures or thru-holes if so desired. It should be appreciated, however, that the cylinder base 34 and the cylinder head 36 can be secured to the housing 32 in any suitable manner, such as by a welded or threaded connection for example.

Referring again to FIG. 3, the illustrated cylinder base 34 is configured to secure the linear actuator 14 to the mounting plate 16. Thus, the cylinder base 34 may include any structural features that are configured to engage a surface of the mounting plate 16 in mating fashion, such as a stepped portion or alignments pins for example. The cylinder base 34 may also include a plurality of thru-holes that are adapted to receive fasteners therein to secure the linear actuator 14 to the mounting plate 16. It should be appreciated, however, that the cylinder base 34 can be secured to the mounting plate 16 in any manner, such as by a welded or threaded connection for example. The cylinder base 34 also includes an aperture that extends therethrough, the purpose of which will be explained below.

Referring again to FIG. 3, the illustrated linear actuator 14 also includes the input member or lead screw 22 that is supported for rotation therein. The lead screw 22 may be a generally elongated member that axially extends within the housing 32. An outer diameter of the lead screw 22 may include a threaded portion, a grooved portion, or any other formed surface, the purposes of which will be explained below. It should be fully appreciated that the lead screw 22 can have any length or diameter and may include any structural features so as to accomplish the functions described herein and below.

Referring again to FIG. 3, a proximal end of the lead screw 22 extends from the first end of the housing 32 through respective apertures formed in both the cylinder base 34 and the mounting plate 16. This arrangement enables the driven pulley 26 to be secured to the lead screw 22 and provide rotational power from the motor 12 to the linear actuator 14, as explained above. The driven pulley 26 can be secured to the lead screw 22 in any manner, including but not limited to a press-fit connection, a key-way, a splined connection, a plurality of fasteners, or any combination thereof.

Referring again to FIG. 3, a first end of the lead screw 22 can be supported for rotation within the housing 32 by a bearing pack 40. The illustrated bearing pack 40 includes four high capacity ball bearing assemblies mounted axially adjacent one another. However, the bearing pack 40 may include any number or configuration of bearing assemblies. Alternatively, the bearing pack 40 can be embodied as any other structure that is adapted to support the first end of the lead screw 22 for rotation within the housing 32.

Referring again to FIG. 3, the illustrated bearing pack 40 is supported within a bearing housing 42, although such is not required. The bearing housing 42 can be a generally cylindrical member having an opening at a first end and an end wall at a second end thereof. The bearing pack 40 can be press-fit or otherwise received within the bearing housing 42 through the open end. The open end of the bearing housing 42 may then be secured to the cylinder base 34 in any suitable manner so as to enclose and support the bearing pack 40 relative thereto. As shown, the lead screw 22 extends through an aperture that is formed in the end wall of the bearing housing 42. A seal (not shown) or the like can optionally be disposed within the aperture and configured to engage an outer surface of the lead screw 22. Further, the bearing housing 42 may include a fitting 44 attached thereto in order to provide a supply of lubrication to the bearing pack 40, although such is not required.

Referring again to FIG. 3, the illustrated linear actuator 14 also includes a load cell 46, although such is not required. The load cell 46 can be any component that is configured to measure the linear force (i.e. press force) produced by the linear actuator 14. For example, the load cell 46 may be a transducer having an arrangement of strain gauges that are adapted to sense the linear force in the lead screw 22. The load cell 46 may also be configured to compensate for temperature variations of the linear actuator 14 if so desired.

Referring again to FIG. 3, the load cell 46 may also be adapted to convert the sensed force into an output signal representative of the measured force. The output signal can be sent to an encoder (not shown) which, in turn, is adapted to control operation of the motor 12 as described above. The linear actuator 14 may optionally include an electrical connector 48 that is attached to an outer surface thereof to provide an electrical connection with the load cell 46. As shown, the load cell 46 is supported relative to the lead screw 22 and is located axially adjacent the bearing pack 40 nearest the first end of the lead screw 22. However, the load cell 46 can be located along any portion of the lead screw 22 as desired.

Referring again to FIG. 3, a second end of the lead screw 22 is supported for rotation within the housing 32 by a shaft bearing 50. As will be described below, the second end of the lead screw 22 extends into an internal portion of a ram 52 that is adapted to move in an axial fashion relative to the lead screw 22. Thus, the shaft bearing 50 can be any structure that is capable of rotatably supporting the second end of the lead screw 22 within the ram 52. In one non-limiting example, the shaft bearing 50 can be a resinous or laminate composite bearing. In another example, the shaft bearing 50 can be made of ultra-high molecular weight (UHMW) polyethylene. The illustrated shaft bearing 50 is secured to the end of the lead screw 22 by a washer and fastener, although any fastening arrangement may be used. It should be appreciated, however, that the second end of the lead screw 22 can be supported for rotation within the housing 32 in any manner.

As described above, the linear actuator 14 is configured to convert torque into a linear force. To accomplish this, the linear actuator 14 may also include an output member or nut assembly 54 that is supported on an outer surface of the lead screw 22. When the lead screw 22 is rotated relative to the nut assembly 54, the nut assembly 54 is configured to travel linearly along a length of the lead screw 22, thereby producing a linear force.

It should be fully appreciated that the nut assembly 54 and the lead screw 22 can be configured in any manner to convert rotational power into a linear force. As one non-limiting example, the nut assembly 54 and the lead screw 22 may be configured as a roller screw. In this embodiment, the nut assembly 54 includes a plurality of rollers (not shown) that are circumferentially spaced about an inner diameter thereof. The rollers each include a threaded outer diameter this is configured to correspond with and engage a threaded portion (not shown) formed along an outer surface of the lead screw 22. Thus, as the lead screw 22 is rotated, the threaded portion of the lead screw 22 applies an axial force on the rollers thereby moving the nut assembly 54 in a linear direction.

Referring again to FIG. 3, the illustrated linear actuator 14 also includes the ram 52 that is secured to the nut assembly 54. The ram 52 can be configured to transfer linear force produced by the nut assembly 54 to a desired work piece (not shown). The illustrated ram 52 is a generally elongated, cylindrical member having openings at both ends thereof. A first end of the ram 52 can be received within or otherwise secured to a second end of the nut adaptor 54. The ram 52 may be secured to the nut adaptor 54 in any suitable manner, including but not limited to a threaded connection, a splined connection, a press-fit connection, or the like. The illustrated ram 52 is a heavy walled, steel structure having ground and polished inner and outer surfaces that are adapted to resist corrosion and reduce surface friction, as will become apparent. However, it should be appreciated that the ram 52 can be any structure that is formed from any desired material. The ram 52 may also be integrally formed with the nut assembly 54 or any portion thereof, such as the nut adaptor 54 if so desired.

Referring again to FIG. 3, the second end of the lead screw 22 extends into an internal region of the ram 54. The shaft bearing 50 is configured to support the second end of the lead screw 22 for rotation within the ram 54. The shaft bearing 50 also allows the ram 54 to axially move relative to the lead screw 22, as briefly described above. It should be appreciated that the shaft bearing 50 and the inner surface of the ram 54 can be configured in any manner to minimize friction therebetween.

Referring again to FIG. 3, the second end of the ram 54 axially extends through an aperture formed in the cylinder head 36. Thus, the illustrated linear actuator 14 also includes a bushing 56 that is disposed within the aperture of the cylinder head 36, although such is not required. The bushing 56 can be any structure that is adapted to facilitate axial movement of the ram 54 relative to the cylinder head 36 and to provide lateral support to the ram 54. For example, the bushing 56 can be a sleeve-like structure that is formed of bronze, copper, or any other desired material. Alternatively, the bushing 56 may include any moveable bearing components if so desired. The bushing 56 may also include a wiper seal (not shown) or the like that is configured to ride along an outer surface of the ram 54 and remove debris therefrom that may otherwise contaminate the linear actuator 14.

Referring again to FIG. 3, the ram 54 may optionally include a ram head 58 secured to a second end thereof. The ram head 58 is, in large part, conventional in the art. For example, the ram head 58 can be embodied as any desired tool piece, such as a press tool, a piercing tool, a joining tool, or the like. The ram head 58 may be secured to the ram 54 in any suitable manner, including but not limited to a threaded connection, a splined connection, or a press-fit connection.

Referring again to FIG. 3, the illustrated linear actuator 14 also includes an internal guide rail system 60 that is configured to prevent the nut assembly 54 from rotating with the lead screw 22 and to maintain precise orientation of the nut assembly 54. The guide rail system 60 can have any desired structure sufficient to prevent the nut assembly 54 from rotating with the lead screw 22 and to maintain precise orientation of the nut assembly 54.

Figure 4:
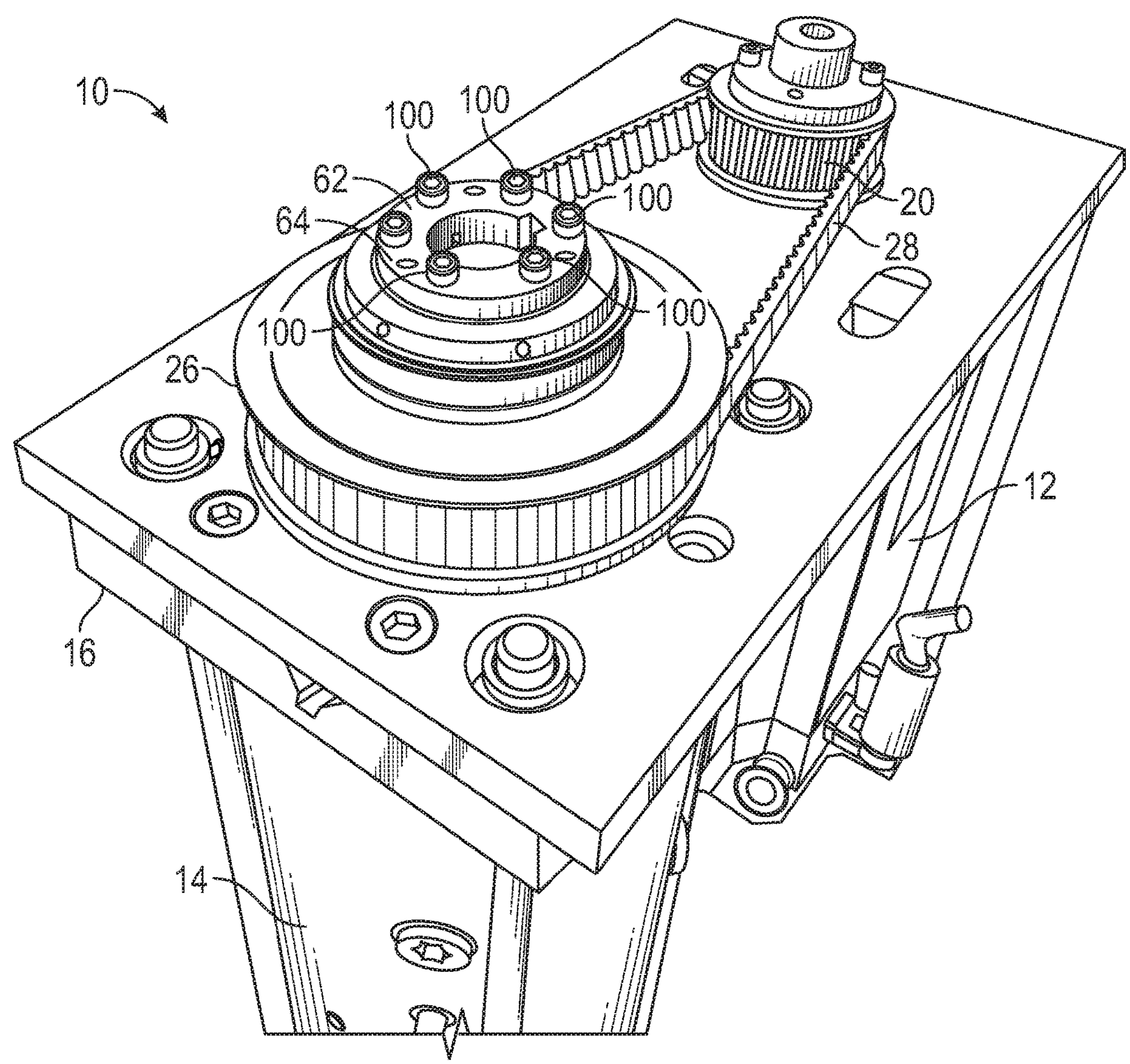
FIG. 4 a top plan view of a portion of the electro-mechanical actuator shown in FIG. 1, with a protective cover removed.

Referring now to FIG. 4, another view of a portion of the actuator assembly 10 is provided. FIG. 4 illustrates the motor 12 and linear actuator 14 mounted to the mounting plate 16. As discussed above, the drive sprocket 20 and the driven sprocket 26 are disposed above the mounting plate 16 and are engaged by the drive belt 28. The driven sprocket 26 is attached to the end portion of the lead screw 22 (not shown). A torque limiter 62 is mounted to the driven sprocket 26 such that rotation of the driven sprocket 26 results in rotation of the torque limiter 62. The torque limiter 62 includes an actuation ring 64 that will be discussed in more detail below.

Referring again to FIG. 4, the torque limiter 62 is configured to prevent damage to the actuator assembly 10 by sensing a pre-determined overload torque level within the linear actuator 14. In the event an overload torque level is sensed by the torque limiter 62, the actuation ring 64 moves in an axial direction away from the torque limiter 62, thereby allowing the separation of the driven sprocket 26 from the lead screw 22. Advantageously, the torque limiter 62 is configured to allow the output shaft of the motor 22 to continue to rotate as the rotation of the driven sprocket 26 is disengaged, thereby prevent damage to the actuator assembly 10 in the event an overload torque level. In the illustrated embodiment, the torque limiter 62 has a pre-determined overload torque level of 120% of the rated torque level of the linear actuator 14. However, in other embodiments, the pre-determined torque level of the torque limiter 62 can be more or less than 120% of the rated torque level of the linear actuator 14.

Referring again to the embodiment illustrated in FIG. 4, the torque limiter 62 is a commercially available, ball detent style overload coupling, such as the model Sk1, manufactured and marketed by the R+W America company, headquartered in Bensenville, Ill. Alternatively, the torque limiter 62 can be other models, structures and assemblies, sufficient to sense a pre-determined overload torque level within the linear actuator 14. In the event an overload torque level is sensed by the torque limiter 62, the actuation ring 64 moves in an axial direction away from the torque limiter 62, thereby allowing the separation of the driven sprocket 26 from the lead screw 22.

Figure 5:
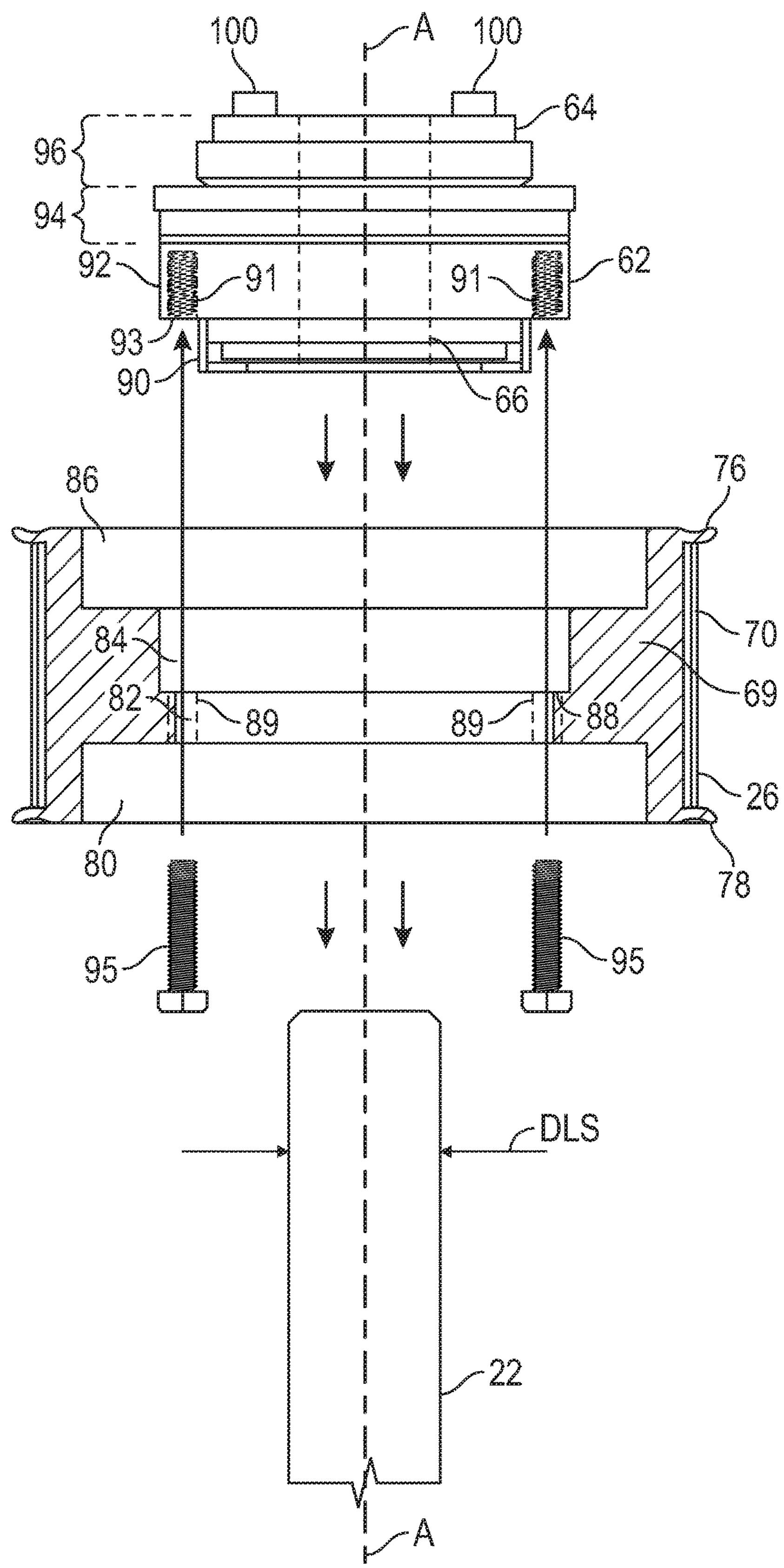
FIG. 5 is an exploded front view of the torque limiter and driven sprocket of FIG. 3.
Figure 6:
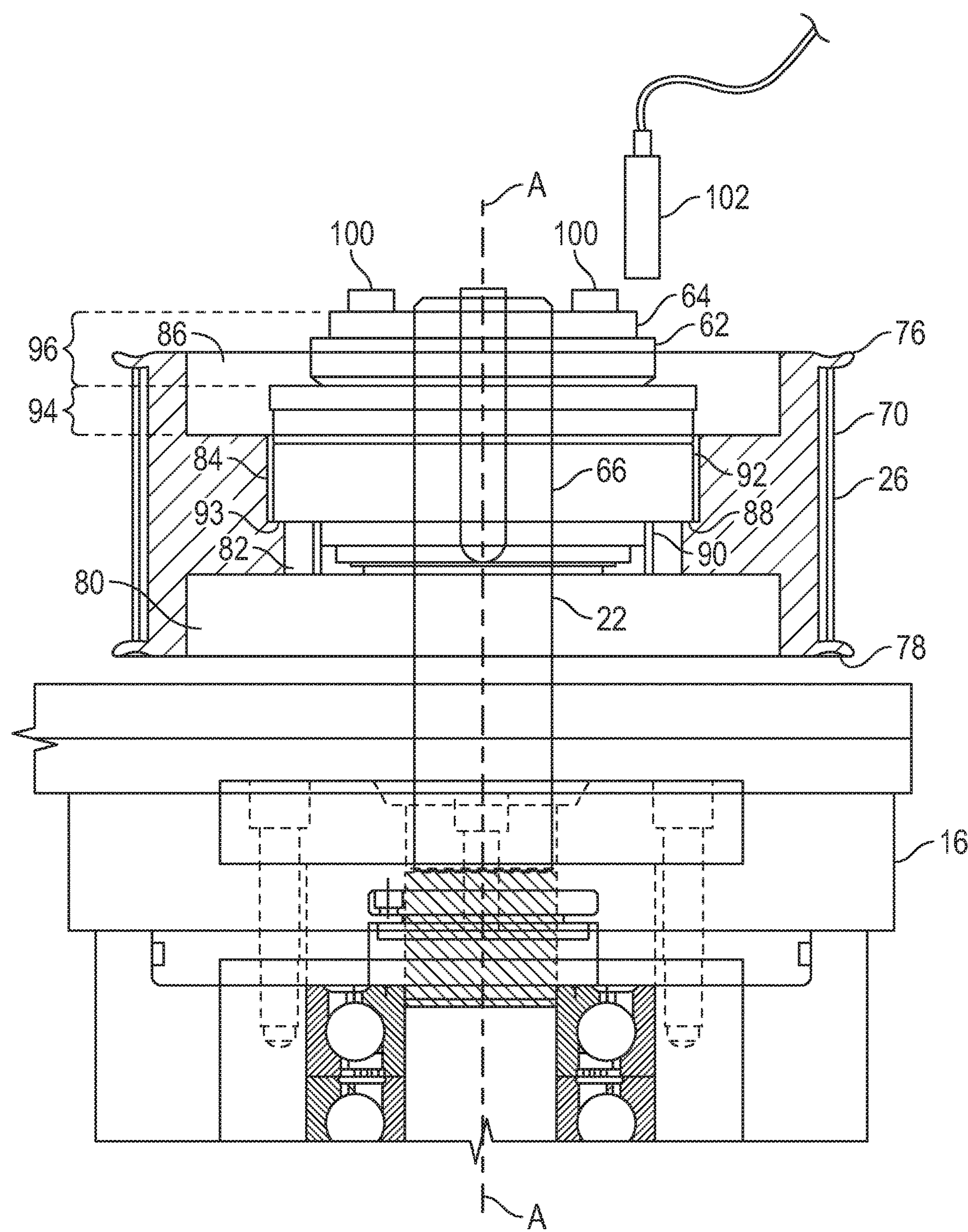
FIG. 6 is an assembled front view of the torque limiter and driven sprocket of FIG. 3.

Referring now to FIGS. 5 and 6, the upper end portion of the lead screw 22, driven sprocket 26 and torque limiter 62 are illustrated. The lead screw 22 has a circular cross-sectional shape and a constant diameter DLS along a longitudinal axis A-A. The upper end portion of the lead screw 22 is configured to extend through a plurality of internal apertures within the driven sprocket 26 and further configured to extend through an internal aperture 66 in the torque limiter 62, such that the torque limiter 62 seats against the driven sprocket 26.

Figure 7:
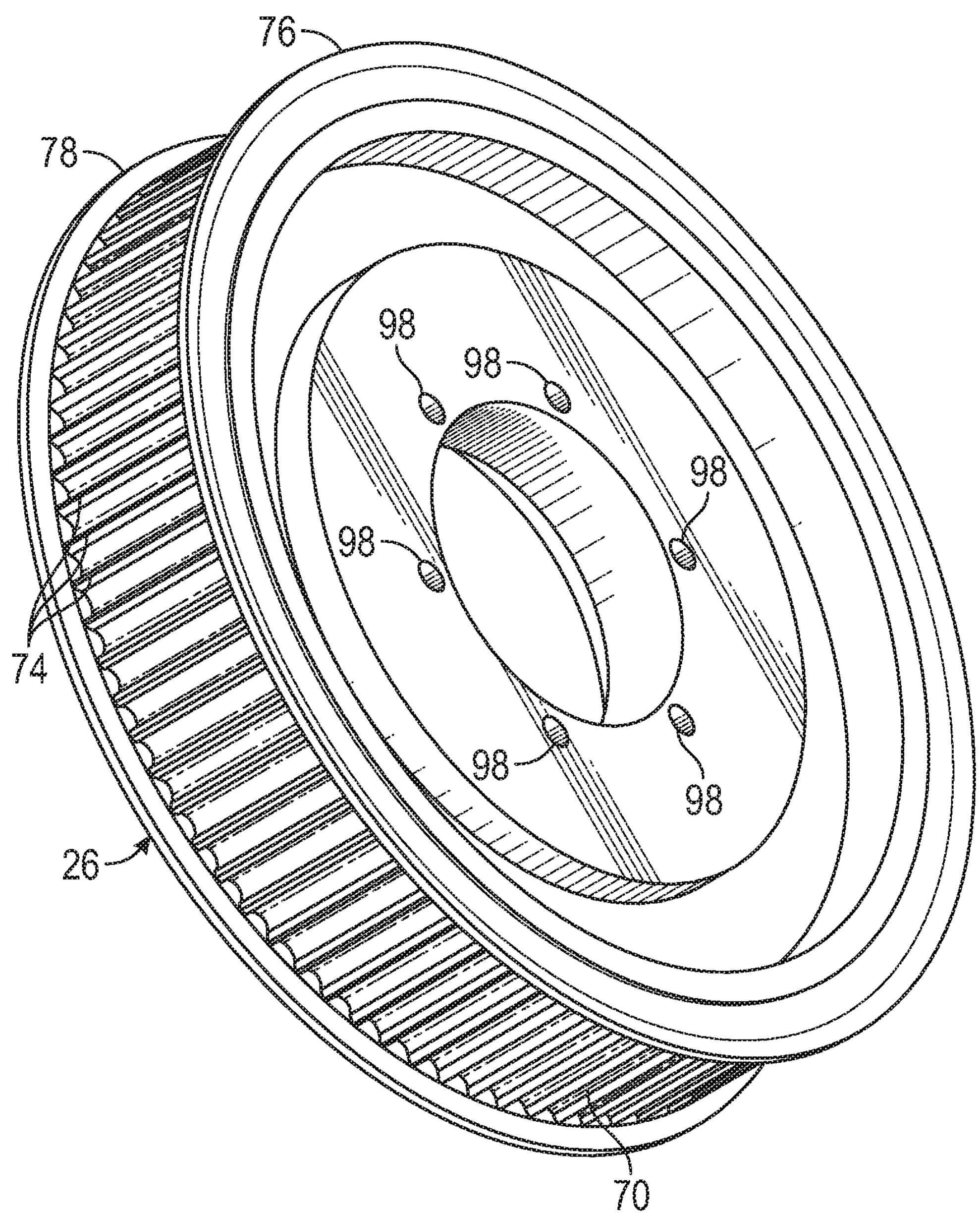
FIG. 7 is a perspective view of the driven sprocket of FIG. 3.

Referring now to FIGS. 5, 6 and 7, the driven sprocket 26 includes a circumferential outer surface 70 radially extending from a main body 59 and having a plurality of spaced apart gear teeth 74. The gear teeth 74 are configured to engage mating structures on the drive belt as is known in the art. The driven sprocket 26 also includes circumferential upper and lower rims 76, 78. The upper and lower rims 76, 78 cooperate to maintain the engaged position of the drive belt with the gear teeth 74 of the driven sprocket.

Referring now to FIGS. 5 and 6, the driven sprocket 26 includes a first aperture 80, a second aperture 82, a third aperture 84 and a fourth aperture 86. The apertures 80, 82, 84 and 86 are internal to the driven sprocket 26 and centered about axis A-A. The apertures 80, 82, 84 and 86 cooperate such as to allow the upper end of the lead screw 22 to extend through the driven sprocket 26.

Referring again to FIGS. 5 and 6, the second aperture 82 has circular cross-sectional shape and a diameter that is smaller than a diameter of the circular cross-sectional shape of the third aperture 84, such that a shoulder 88 is formed therebetween. The diameter of the third aperture 84 and the shoulder 88 will be discussed in more detail below.

Referring again to FIGS. 5 and 6, a first portion 90 of the torque limiter 62 has a circular cross-sectional shape and a diameter that is less than the diameter of the second aperture 82 of the driven sprocket 26, such that in an installed position, the first portion 90 of the torque limiter 62 seats within the diameter of the second aperture 82 of the driven sprocket 26 with a clearance fit within the second aperture 82. A second portion 92 of the torque limiter 62 has a circular cross-sectional shape and a diameter that approximates the diameter of the third aperture 84 of the driven sprocket 26. The second portion 92 also includes a lower surface 93. In an installed position, the lower surface 93 of the second portion 92 seats against the shoulder 88 and an outer surface of the second portion 92 of the torque limiter 62 seats within the diameter of the third aperture 84 of the driven sprocket 26 with an interference fit.

Referring again to FIGS. 5 and 6, a third and fourth portions 94, 96 of the torque limiter 62 have circular cross-sectional shapes and diameters that are less than the diameter of the fourth aperture 86 of the driven sprocket 26, such that in an installed position, the third and fourth portions 94, 96 of the torque limiter 62 seat within the diameter of the fourth aperture 82 of the driven sprocket 26 with a clearance fit within the fourth aperture 86.

Referring now to FIG. 5, the driven sprocket 26 includes a plurality of clearance apertures 89 extending through the second aperture 82 and the torque limiter 62 includes a plurality of threaded apertures 91 extending into the second portion 92. A plurality of fasteners 95 are configured to secure the driven sprocket 26 to the torque limiter 62 by extending through the clearance apertures 89 in the driven sprocket 26 and threading into the threaded apertures 91 in the torque limiter 62. In the illustrated embodiment, the fasteners 95 are socket head cap screws. However, in other embodiments, the fasteners 95 can be other structures sufficient to secure the driven sprocket 26 to the torque limiter 62. It should be further appreciated that in other embodiments, the driven sprocket 26 can be secured to the torque limiter 62 with other structures, mechanisms and devices.

Referring again to FIG. 7, the driven sprocket 26 includes a plurality of spaced apart, threaded apertures 98. The threaded apertures 98 are configured to receive fasteners 100 extending through the torque limiter 62. In an installed position as shown in FIG. 6, the fasteners 100 extend through the torque limiter 62 and into the threaded apertures 98 of the driven sprocket 26 in a manner such as to secure the torque limiter 62 to the driven sprocket 26. In this position, the internal aperture 66 of the torque limiter 62 engages the upper end of the lead screw 22. In the illustrated embodiment, the fasteners 100 are socket head cap screws. However, in other embodiments, the fasteners 100 can be other structures, mechanisms and devices sufficient to secure the torque limiter 62 to the driven sprocket 26 such that the internal aperture 66 of the torque limiter 62 engages the upper end of the lead screw 22.

The manner of mounting the torque limiter to the driven sprocket with the use of fasteners advantageously allows the use of torque limiters having internal apertures with different configurations. As one non-limiting example, the internal aperture can have a conical or tapered configuration typically used for machine tool spindles. As another non-limiting example, the internal aperture can have a cross section with a constant diameter, as is also used for machine tool applications.

Referring now to FIG. 6, a torque limiter actuation sensor 102 is mounted proximate the torque limiter 62 and is configured to sense the vertical displacement of the actuation ring 64 from the torque limiter 62. In the event the linear actuator 14 is operating within the pre-determine torque limits, the actuation ring 64 is seated against the fourth portion 96 of the torque limiter 62 and the torque limiter 62 allows engagement with the lead screw 22. In the event the linear actuator 14 is operating above the pre-determine torque limits, the actuation ring 64 is displace a distance from the fourth portion 96 of the torque limiter 62 and the torque limiter 62 prevents engagement with the lead screw 22. The displacement of the actuation ring 64 from the fourth portion 96 of the torque limiter 62 is sensed by the torque limiter actuation sensor 102, which in turn triggers the motor 12 to shut down.

While the embodiment of the torque limiter actuation sensor 102 illustrated in FIG. 6 has the form of a capacitance-based sensor, it should be appreciated that in other embodiments, the torque limiter actuation sensor 102 can have other forms, such as the non-limiting examples of a mechanical switch or proximity sensor.

The principle and mode of operation of the linear actuator having a torque limiter mounted to a driven sprocket have been described in certain embodiments. However, it should be noted that the linear actuator having a torque limiter mounted to a driven sprocket may be practiced otherwise than as specifically illustrated and described without departing from its scope.

What is claimed is:

1. A driven sprocket configured for rotational use in a linear actuator, the driven sprocket comprising:
   - an outer circumferential surface extending radially from a main body, the outer circumferential surface having a plurality of spaced apart gear teeth, the gear teeth configured to engage corresponding structures of a drive belt;
   - an upper rim and a lower rim bounding the outer circumferential surface and configured to maintain a drive belt in an engaged position with the gear teeth;
   - a plurality of internal apertures extending therethrough, the internal apertures configured to receive portions of a lead screw and portions of a torque limiter; and
   - a plurality of spaced apart apertures configured to receive fasteners configured to secure the torque limiter to the driven sprocket in a manner such that rotation of the driven sprocket results in rotation of the torque limiter.

2. The driven sprocket of claim 1, wherein the driven sprocket and the torque limiter are centered about a common axis.

3. The driven sprocket of claim 1, wherein the plurality of internal apertures extending through the driven sprocket are centered about a common axis.

4. The driven sprocket of claim 1, wherein the plurality of internal apertures extending through the driven sprocket include at least one internal aperture configured to receive a portion of the torque limiter with an interference fit.

5. The driven sprocket of claim 1, wherein the torque limiter includes an actuation ring configured for movement in an axial direction away from the torque limiter.

6. The driven sprocket of claim 1, wherein the plurality of internal apertures includes a first aperture in radial alignment with the lower rim.

7. The driven sprocket of claim 6, wherein the plurality of internal apertures includes a second aperture extending in an inward direction from the first aperture.

8. The driven sprocket of claim 7, wherein the plurality of internal apertures includes a third aperture extending from the second aperture.

9. The driven sprocket of claim 8, wherein the plurality of internal apertures includes a fourth aperture in radial alignment with the upper rim.

10. The driven sprocket of claim 9, wherein the first, second, third and fourth apertures are centered about a common axis.

11. The driven sprocket of claim 10, wherein a diameter of the second aperture is smaller than a diameter of the first aperture.

12. The driven sprocket of claim 10, wherein a diameter of the third aperture is smaller than a diameter of the first aperture.

13. The driven sprocket of claim 10, wherein a first portion of the torque limiter seats in the second aperture with an interference fit.

14. The driven sprocket of claim 10, wherein a second portion of the torque limiter seats against a shoulder formed between the second and third portions of the driven sprocket.

15. The driven sprocket of claim 10, wherein a second portion of the torque limiter seats in the third aperture.

* * * * *